United States Patent
Wentroble et al.

(10) Patent No.: US 11,803,497 B2
(45) Date of Patent: Oct. 31, 2023

(54) UNIVERSAL SERIAL BUS REPEATER WITH IMPROVED REMOTE WAKE CAPABILITY

(71) Applicant: TEXAS INSTRUMENTS INCORPORATED, Dallas, TX (US)

(72) Inventors: Mark E. Wentroble, Plano, TX (US);
Suzanne M. Vining, Plano, TX (US);
Rakesh Hariharan, Bangalore (IN);
Anant Kamath, Bangalore (IN);
Prajwala Puttappa, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 17/709,812

(22) Filed: Mar. 31, 2022

(65) Prior Publication Data
US 2023/0065119 A1  Mar. 2, 2023

Related U.S. Application Data (60) Provisional application No. 63/236,818, filed on Aug. 25, 2021.

(51) Int. Cl.
*G06F 13/38* (2006.01)
*G06F 9/4401* (2018.01)
*G06F 13/42* (2006.01)

(52) U.S. Cl.
CPC .......... *G06F 13/382* (2013.01); *G06F 9/4413* (2013.01); *G06F 13/4282* (2013.01); *G06F 2213/0042* (2013.01)

(58) Field of Classification Search
CPC ..................................................... H04L 12/12
See application file for complete search history.

(56) References Cited

U.S. PATENT DOCUMENTS

| | | | | |
|---|---|---|---|---|
| 5,202,593 A | * | 4/1993 | Huang | H03K 5/026 370/293 |
| 5,455,521 A | * | 10/1995 | Dobbelaere | H03K 19/01721 326/86 |
| 2004/0225793 A1 | * | 11/2004 | Hunter | G06F 13/4045 710/300 |

OTHER PUBLICATIONS

"Universal Serial Bus Specification, Revision 2.0" (Compaq Computer Corporation, Hewlett-Packard Company, Intel Corporation, Lucent Technologies Inc, Microsoft Corporation, NEC Corporation, Koninklijke Philips Electronics N.V., Apr. 27, 2000), pp. i, ii, 119-170, 191-194.

(Continued)

*Primary Examiner* — Henry Tsai
*Assistant Examiner* — Juanito C Borromeo
(74) *Attorney, Agent, or Firm* — Valerie M. Davis; Frank D. Cimino (57) ABSTRACT

Various configurations of high-speed data communication devices, e.g., repeaters, interfacing between a host and a peripheral, and methods of operating the same, are provided to improve the Remote Wake sequence. Repeaters include circuitry to detect the start of Resume signaling or the end of Resume, following initiation of Remote Wake. In an example, pull-up resistors coupled to upstream differential signal lines and a detection circuit with a current source are controlled to detect the start of Resume signaling. In another example, the upstream-side pull-resistors and an enable signal to an upstream-side transmitter are controlled to detect the end of Resume.

22 Claims, 7 Drawing Sheets

(56) References Cited

OTHER PUBLICATIONS

"ISO774x High-Speed, Robust-EMC Reinforced and Basic Quad-Channel Digital Isolators", Datasheet SLLSEP4G (Texas Instruments Incorporated, Feb. 2020).
"ADuM3160 Full/Low Speed 2.5 kV USB Digital Isolator" Datasheet, (Analog Devices, Inc., 2014).
"LTM 2884 Isolated USB Transceiver with Isolated Power" Datasheet (Analog Devices, Inc., Feb. 2020).
Patterson et al., "Operation of a Giant Magnetoresistive (GMR) Digital Isolator, Type IL510, Under Extreme Temperatures" (NASA Electronic Parts and Packaging Program, Sep. 2010).

* cited by examiner

UNIVERSAL SERIAL BUS REPEATER WITH IMPROVED REMOTE WAKE CAPABILITY

CROSS-REFERENCE TO RELATED APPLICATIONS

This application claims priority on U.S. provisional application No. 63/236,818, entitled "Meeting USB L1 Remote Wake requirements in an Isolation Repeater," filed Aug. 25, 2021, the content of which is incorporated by reference herein in its entirety. This application is related to U.S. application Ser. No. 17/246,137, entitled "Isolated Universal Serial Bus Repeater with High Speed Capability", the content of which is incorporated by reference herein in its entirety.

FIELD OF DISCLOSURE

This disclosure relates generally to transceivers, e.g., universal serial bus (USB) repeaters, and more particularly to USB repeaters with improved Remote Wake capability.

BACKGROUND

The use of USB technology among and between various electronic devices has become ubiquitous in recent years. USB communications are implemented and carried out according to industry standard specifications. One attractive attribute of USB communication technology is its ease of use, particularly the flexibility the technology offers in connecting peripherals to hosts or to other devices directly or via hubs or bus splitters. The USB network is essentially self-configuring, allowing the user to simply plug in or remove a device from an ad hoc USB network without configuring device settings, interrupts, I/O addresses, and the like. From the manufacturer's standpoint, the use of USB eliminates the need for the system designer to develop proprietary interfaces to later-developed peripheral devices, or to implement interface hardware and software to maintain compatibility with older devices.

USB communication signaling protocol supports, among other features, multiple modes, including a sleep or low power mode (L1), a suspend mode (L2) and a Resume feature, as well as multiple driving states, i.e., J and K. One way to exit from L1 or L2 is through Remote Wake signaling initiated by the peripheral, followed by signaling from the host/hub. Such signaling involves driving a particular state, i.e., a K driving state. In such a transition, a USB repeater needs to know when to stop driving K to the host so that the USB repeater can properly detect the end of the host signaling, which is part of the end-of-packet segment, and relay this information to the peripheral. Because such signaling sequence has very tight timing constraints, as defined by the Low Power Management ECN for L1, without a highly accurate clock, it is difficult for the USB repeater to ensure that the peripheral device remains in the K state long enough for the host to respond, but not too long such that the end of the host signaling is missed.

Some conventional implementations use a timer for this scenario but without a highly accurate clock. An assumption is made that the host will not actually take the maximum allowable time (48 μs) to respond to the signaling from the peripheral to exit L1/L2, so the maximum value of the timer is set to less than the maximum allowable time (i.e., set to <48 μs) to capture the end of the host signaling.

A better solution to this issue is desired and needed.

SUMMARY

An example method involves operating a repeater in communicating between a first device (e.g., a host) and a second device (e.g., a peripheral) through the repeater. The method comprises: driving data in a first direction from the second device to the first device (e.g., downstream-to-upstream), including driving to a logic high state a first signal line, of a pair of signal lines between the first device and a first-device-side transceiver (e.g., a host-side USB controller) of the repeater, and not driving a second signal line of the pair of signal lines; disabling a resistive element coupled between a power supply voltage and a second signal line of the pair of signal lines; enabling a detection circuit of the first-device-side transceiver including applying current to the second signal line; driving, by the first device, the first signal line to a logic high state and the second signal line to a logic low state; detecting a changed signal level on the second signal line using the detection circuit; and changing data flow from the first direction to a second direction from the first device to the second device (e.g., upstream-to-downstream), in response to the detecting.

Another example method also involves operating a repeater in communicating between a first device (e.g., a host) and a second device (e.g., a peripheral) through the repeater. The method comprises: driving data in a first direction from the second device to the first device (e.g., downstream-to-upstream); driving a first signal line of a pair of signal lines between the first device and a first-device-side transceiver of the repeater to a logic low state, and driving a second signal line of the pair of signal lines to a logic high state (e.g., driving K to the host); disabling a first pull-up resistive element coupled between a power supply voltage and the first signal line and enabling a second pull-up resistive element coupled between the power supply voltage and the second signal line; changing data flow from the first direction to a second direction from the first device to the second device (e.g., upstream-to-downstream); detecting a single-ended zero (SE0) state; and enabling the first pull-up resistive element and disabling the second pull-up resistive element.

In an example, a repeater comprises a transceiver that includes a detection circuit. The detection circuit comprises a first current source and a first comparator having first and second inputs and an output. The first input of the first comparator is coupled to a first signal line of a pair of signal lines and to the first current source, and the second input of the first comparator is configured to receive a reference signal. The output of the first comparator is configured to output a first detection signal. The detection circuit further comprises a second current source and a second comparator having first and second inputs and an output. The first input of the second comparator is coupled to a second signal line of the pair of signal lines and to the second current source, and the second input of the second comparator is configured to receive the reference signal. The output of the second comparator is configured to output a second detection signal.

Another example repeater comprises a first assembly including a first pull-up resistor and a first switch. The first assembly is coupled to a first signal line of a pair of signal lines, and the first switch is moveable between an open position in which the first pull-up resistor is disconnected from the first signal line and a closed position in which the first pull-up resistor is connected to the first signal line. The repeater further comprises a second assembly including a second pull-up resistor and a second switch. The second assembly is coupled to a second signal line of the pair of signal lines, and the second switch moveable between an open position in which the second pull-up resistor is disconnected from the second signal line and a closed position in which the second pull-up resistor is connected to the second signal line. A transmitter of the repeater is coupled to the first and second signal lines and further includes an enable input configured to receive an enable signal based on the positions of the first and second switches.

An example method of operating a Universal Serial Bus (USB) repeater in communicating between a first device (e.g., a host) and a second device (e.g., a peripheral) through the USB repeater comprises driving Remote Wake signaling by the second device including driving a K state to exit from a sleep or suspend state; detecting, using circuitry of the USB repeater, when the first device starts driving Resume signaling; and changing data flow from a first direction from the second device to the first device to a second direction from the first device to the second device, in response to the detecting.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers and other reference designators are used in the drawings to designate the same or similar (structurally and/or functionally) features.

DETAILED DESCRIPTION

Specific examples are described below in detail with reference to the accompanying figures. These examples are not intended to be exhaustive or limiting. The objects depicted in the drawings are not necessarily drawn to scale.

Example structural configurations and operating methods provide improved ways of exiting an L1 or L2 state via Remote Wake signaling in a USB communication network. In an example, a detection circuit is employed in a host-side transceiver to detect when a host starts driving a K state to the start the process of changing the direction of data flow. In an example, the detection circuit includes a current source to deliver a small amount of current to the J signal line and a comparator to detect a reduced voltage on that line when the host begins Resume signaling (i.e., driving K). In another example, a pair of switch-actuated pull-up resistors coupled to the pair of upstream different signal lines, respectively, are controlled to facilitate the exit.

Figure 1:
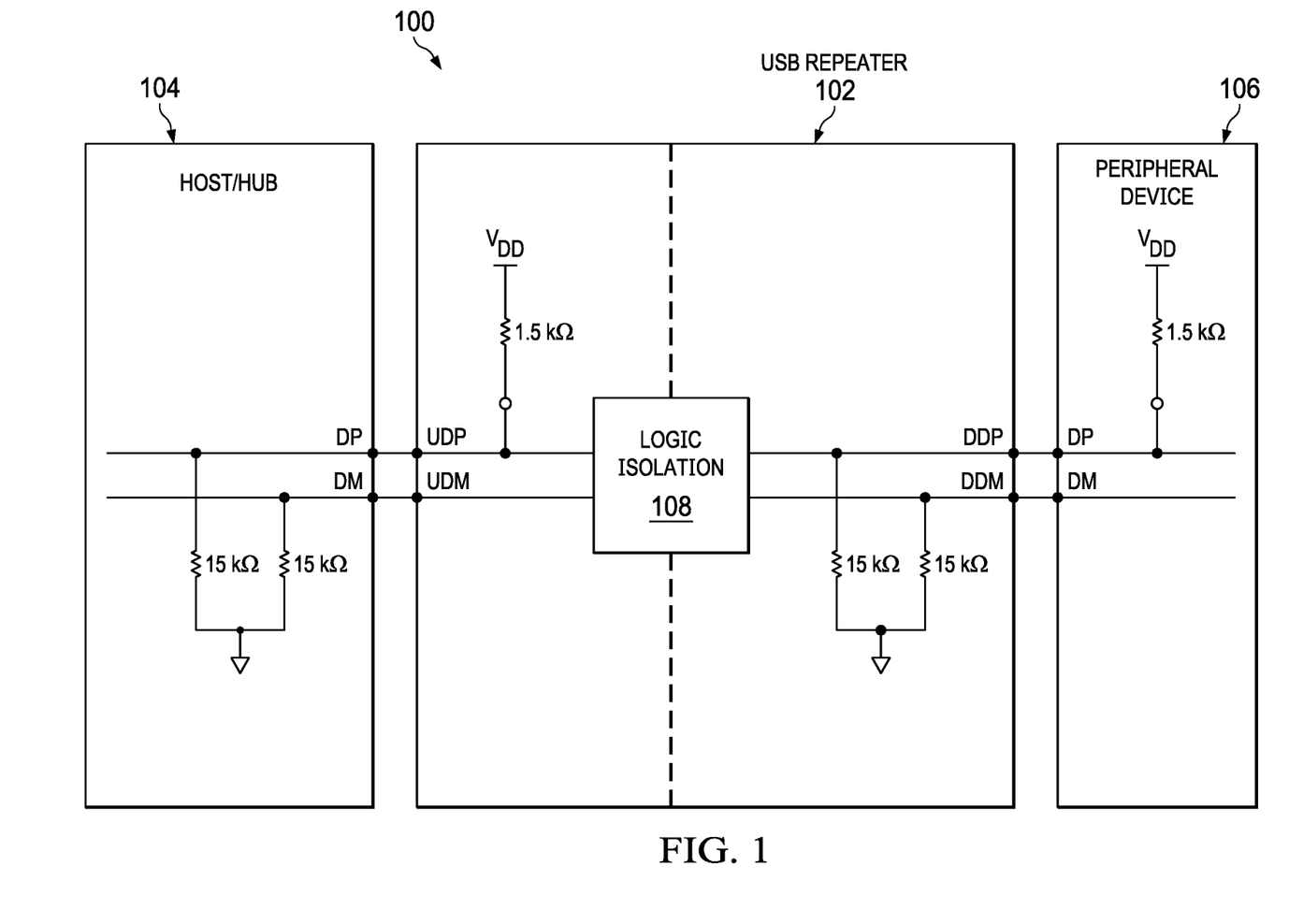
FIG. 1 is a diagram of an example network, e.g., a USB network, that includes an example repeater, e.g., a USB repeater, coupled between a host device and a peripheral device.

By way of background, FIG. 1 is a diagram of a communication network 100, e.g., a USB network, that includes a repeater 102, e.g., a USB repeater, coupled between a host device, which may be a hub, (host) 104 and a peripheral device (peripheral) 106. USB repeater 102 may have a host-side USB transceiver and a peripheral-side USB transceiver. According to USB standards, USB repeater 102 has upstream differential input/output (I/O) ports UDP and UDM in the host-side USB transceiver for coupling to ports DP and DM, respectively, in host 104. USB repeater 102 also has downstream differential I/O ports DDP, DDM in the peripheral-side USB transceiver for coupling to ports DP and DM, respectively, in peripheral 106. A pair of upstream differential signal lines, one between DP and UDP and the other between DM and UDM couple repeater 102 to host 104. Another pair of downstream differential signal lines, one between DDP and DP and another between DDM and DM in peripheral 106 couple repeater 102 to peripheral 106. In these designations, the letter "P" refers to a positive (+) port and the letter "M" refers to a negative (−) port.

In the description herein, the differential signal line(s) between the repeater (or host-side transceiver thereof) and host 104 are considered "upstream," and differential signal line(s) between the repeater (or peripheral-side transceiver thereof) are considered "downstream". However, it is to be understood that "upstream" and "downstream" are relative terms.

Communication network 100 includes a pair of 15 kΩ pull-down resistors on each of the host and peripheral sides. In an example configuration, host-side pull-down resistors are disposed in host 104 and respectively coupled between the DP and DM signal lines and ground. A corresponding resistive configuration is also included in the peripheral-side USB transceiver. Each of the pull-down 15 kΩ resistors may be switch-enabled. When no peripheral/device is connected, the host-side 15 kΩ pull-down resistors pull both differential signal lines low into a single-ended zero (SE0) state.

Repeater 102 includes logic 108 for interfacing the two USB transceivers, as is known in the art. Repeater may also optionally include isolation between the two transceivers. That is, repeater 102 may be a galvanically-isolated USB compliant repeater.

Repeater 102 may support low speed (LS) (1.5 Mbps), full speed (FS) (12 Mbps) and high speed (HS) (480 Mbps) signaling rates, as well as automatic connect and speed detection, reflection of pull-up and pull-down resistors, and link power management allowing drop-in USB hub, host, peripheral and cable isolation. Repeater 102 may also support automatic role reversal: if after disconnect, a new connect is detected on the upstream facing port, then the upstream and downstream I/O ports are reversed.

According to operative USB standards, both data transmission and control signaling are carried out on the pairs of differential signal lines in each of the FS, LS, and HS operating modes. Data transmission on the differential signal lines is communicated using three states: differential "1", differential "0" and a single ended zero (SE0) condition (both lines low). FIG. 1, in which the P signal lines are pulled up to a supply voltage $V_{DD}$ (approximately 3.3 V), via the 1.5 kΩ resistors, depicts the line state in FS idle (or J state).

Control signaling includes the communication of operating states such as disconnected, idle (J state), K state, etc., as well as the operating mode (e.g., FS or LS), of repeater 102. The pull-up and pull-down resistors are used in connection with detecting these various states. Control signaling in USB on the pair of differential signal lines also indicates events such as reset, start-of-packet (SOP), end-of-packet (EOP), end of Resume (EOR), and the like. The levels of the upstream differential signal lines make transitions at the FS data rate according to the last few data bits of the packet. Following the last bit of the packet, EOP is indicated by the transmitting device (e.g., host 104) pulling both the upstream differential signal lines to a low level (SE0). According to USB standards, in FS and LS modes, EOR is indicated by an SE0 for two LS bit times, followed by a J state (i.e., the negative upstream differential signal line high and the positive upstream differential signal line low) for one bit period. In a HS device, which is in FS mode during sleep mode (L1) or suspend mode (L2), EOR will set and keep SE0 as it switches to HS mode. Additional signaling is specified in the applicable USB specifications, which are incorporated by reference herein.

Exit from sleep mode (L1) or suspend mode (L2) may be initiated either Resume signaling from host 104 (on the upstream side of repeater 102), or through Remote Wake signaling from peripheral 106 (on the downstream side of repeater 102). The structures and methods disclosed herein provide an improved way of exiting L1/L2 via Remote Wake signaling.

Figure 2:
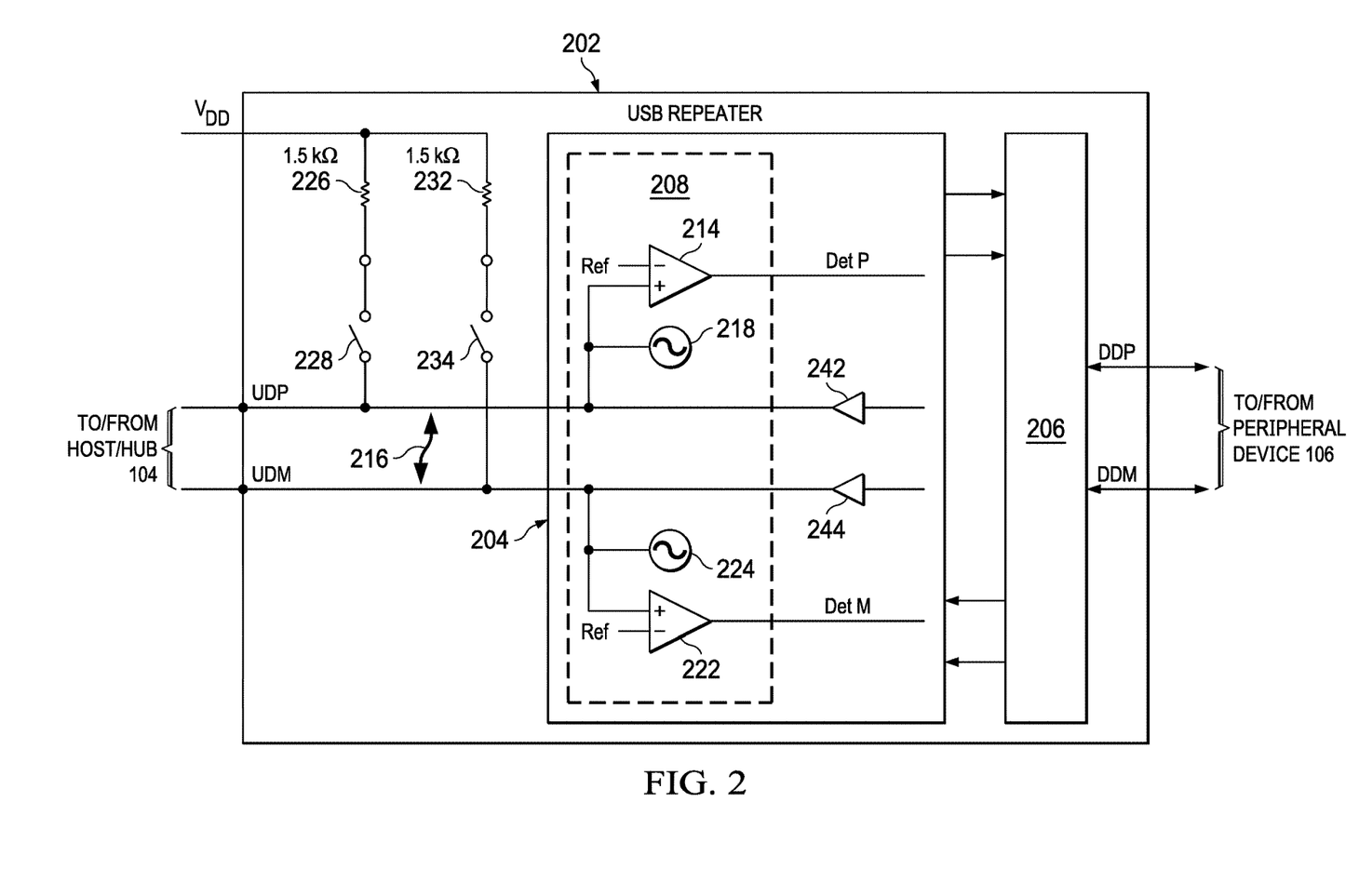
FIG. 2 is a diagram of an example repeater, e.g., a USB repeater, configured with example host-side and peripheral-side transceivers, e.g., USB controllers.

FIG. 2 is a diagram of an example repeater 202, e.g., a USB repeater, configured with example host-side and peripheral-side transceivers 204 and 206, respectively. Each of transceivers 204 and 206 may be a USB controller. Host-side transceiver 204 includes a detector 208, e.g., detection circuit, that is configured to facilitate the turnaround process of changing direction of data flow on both sides of repeater 202 during Remote Wake. Detector 208 may be a high-speed (HS) termination detector which is used for other functions in HS mode.

Detector 208 includes a first comparator and current source assembly, and a second comparator and current source assembly. First comparator 214 has a positive (+) input terminal coupled to the positive signal line of upstream differential signal lines 216 and a negative (−) input terminal configured to receive a reference signal (Ref). First comparator 214 also has an output at which a detection signal (DetP) is output. First current source 218 is coupled to the positive signal line of lines 216 and to the positive (+) input terminal of first comparator 214. Second comparator 222 has a positive (+) input terminal coupled to the negative signal line of upstream differential signal lines 216 and a negative (−) input terminal configured to receive the reference signal (Ref). Second comparator 222 also has an output at which a termination detection signal (Det M) is output. Second current source 224 is coupled to the negative signal line of lines 216 and to the positive (+) input terminal of second comparator 222.

Host-side transceiver 204 also includes a pair of receivers 242 and 244 respectively coupled to the positive and negative lines of upstream differential signal lines 216. Receivers 242 and 244 are configured to receive differential signals from respective transmitters of peripheral-side transceiver 206.

Repeater 202 also includes a first 1.5 kΩ pull-up resistor 226 coupled via a switch 228 to the positive signal line of upstream differential signal lines 216, and a second 1.5 kΩ pull-up resistor 232 coupled via a switch 234 to the negative signal line of lines 216. Switches 228 and 234 may be opened and closed in any suitable way consistent with the teachings herein, e.g., via a control mechanism in host-side transceiver 204. Host-side and peripheral-side 15 kΩ pull-down resistors are not shown in FIG. 2 for clarity. Repeater 202 may include other components, as is known in the art. These other components are omitted for clarity and focus.

Figure 3:
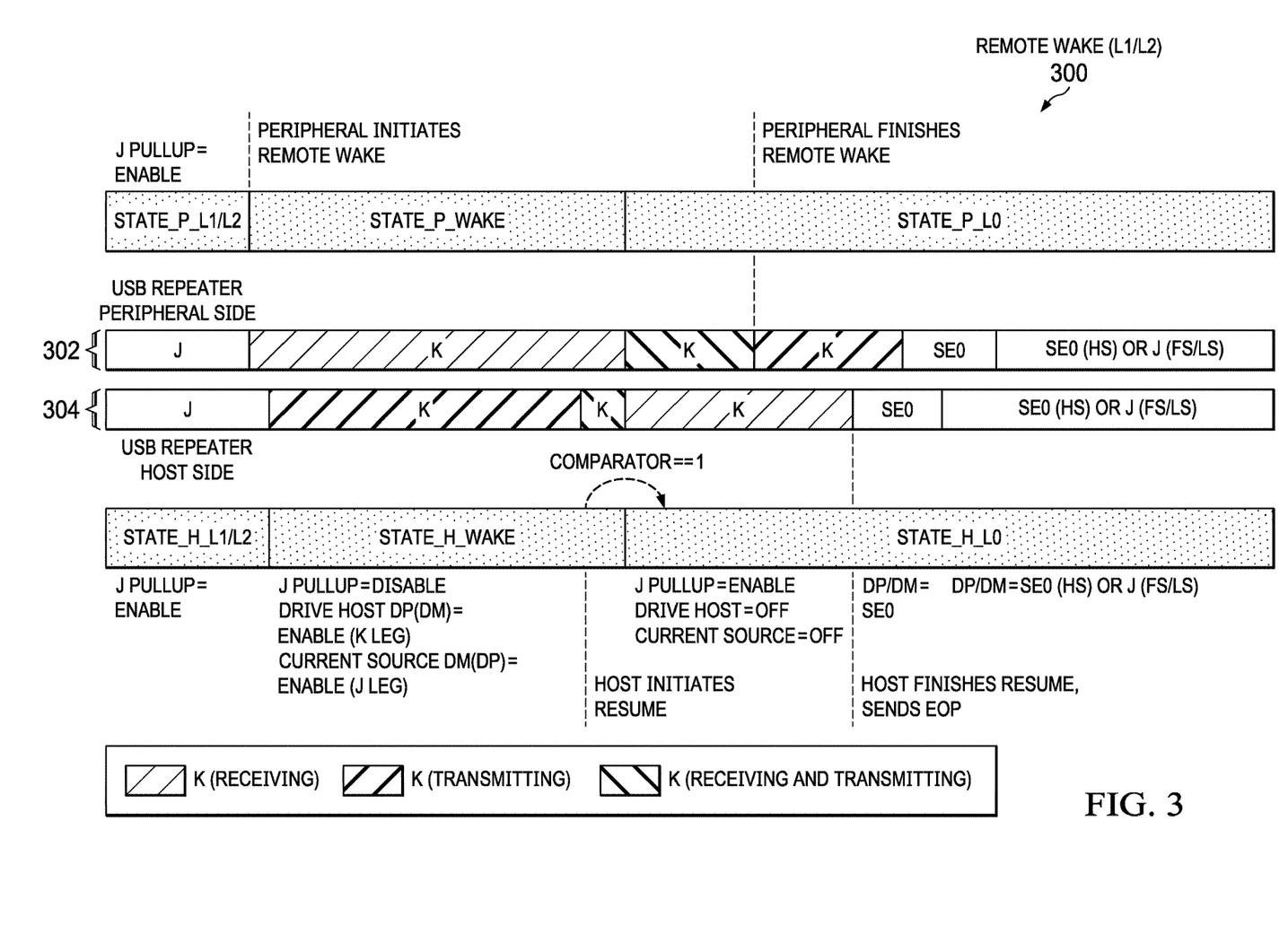
FIG. 3 is a timing diagram illustrating signaling for a Remote Wake sequence using a repeater, such as that shown in FIG. 2.
Figure 4:
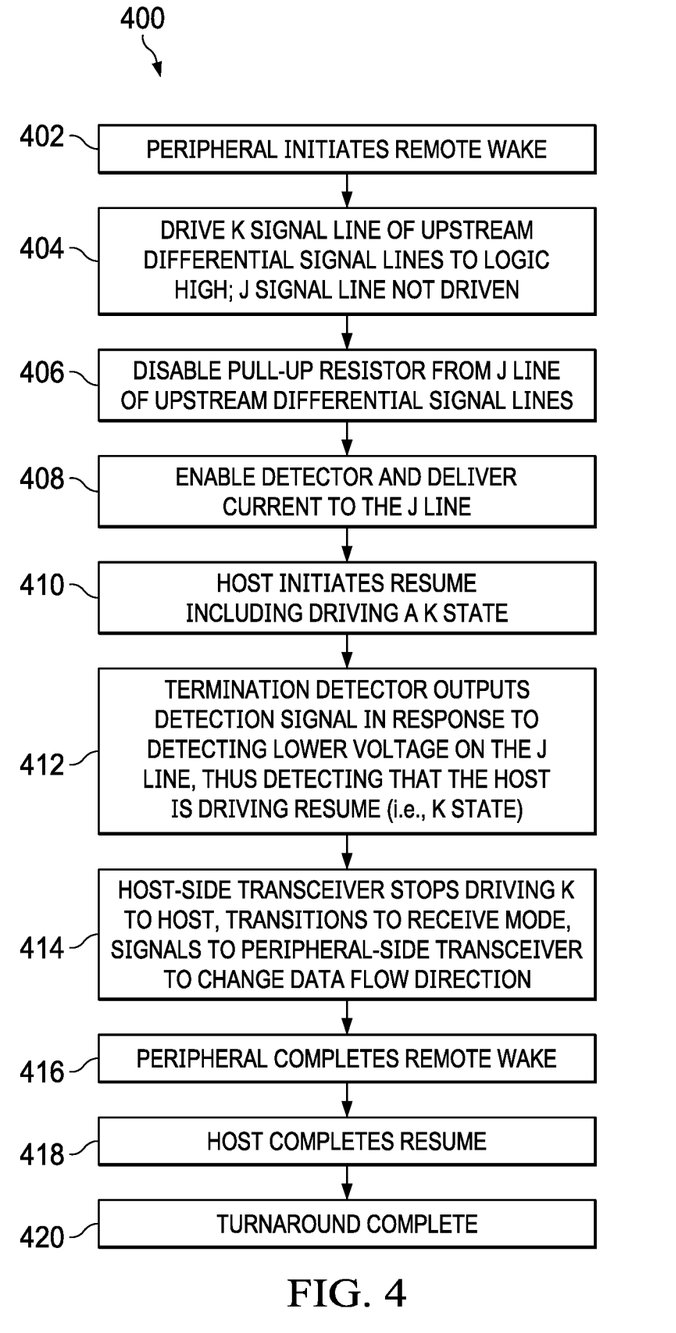
FIG. 4 is a flow diagram of an example method of operating an example repeater to execute the Remote Wake sequence signaling shown in FIG. 3.

FIG. 3 is a timing diagram illustrating signaling for a Remote Wake sequence using a repeater, such as repeater 202 shown in FIG. 2, and FIG. 4 is a flow diagram depicting a method of operating repeater 202 in executing the Remote Wake sequence signaling shown in FIG. 3. As previously noted, under USB protocol, exit from L1/L2 by peripheral 106 may occur through Remote Wake signaling, which has very tight timing constraints. Without a highly accurate clock, however, during Remote Wake, it is difficult for a repeater to ensure that the peripheral remains in the K state long enough for the host to respond, but not too long such that an SE0 signal from the host is missed. Remote Wake sequence 300 shown in FIG. 3 and Remote Wake signaling method 400 of FIG. 4 solves this issue. The top middle bar 302 in FIG. 3 depicts activity on the downstream differential signal lines between the repeater 202 and peripheral 106 from the point of view of repeater 202. The bottom middle bar 304 in FIG. 3 depicts activity on the upstream differential signal lines between repeater 202 and host 104 also from the point of view of repeater 202.

When peripheral 106 initiates Remote Wake (operation 402), e.g., from the J or idle state in which the 1.5 kΩ resistor on the J line is enabled, K signaling is driven upstream on both sides of repeater 202. However, in operation 404, host-side transceiver 204 only drives the K signal line (i.e., the negative line of upstream differential signal lines 216 in FS mode) high for a relatively small, fixed amount of time, e.g., 30 µs; the J signal line (positive line of upstream differential signal lines 216 in FS) is not driven. The 1.5 kΩ pull-up resistor on the J line is disabled (off) or removed (operation 406), and the components of detector 208 associated with that line are enabled (operation 408). That is, in FS mode, 1.5 kΩ pull-up resistor 226 is decoupled from the J line via the opening of switch 228, and comparator 214 and current source 218 are enabled. When enabled, current source 218 delivers a small amount of current (approximately 60-80 µA) to the J line to raise the voltage on that signal line but not high enough to trigger a logic high (e.g., 1) at a single-ended receiver in host 104 that is coupled to the J line. That is, the current is low enough to ensure that host 104 detects the J line at logic low (e.g., 0).

Then, when host 104 begins Resume in operation 410, the K state is driven on both upstream differential signal lines 216 by both repeater 202 and host 104. The driving of K by host 104 essentially overrides the current applied to the J signal line, driving the K line to logic high and the J line to logic low. At this time, comparator 214 detects a reduced voltage level on the J line, as the J line is now pulled down strongly by host 104. In response, comparator 214 outputs the detection signal (DetP) in operation 412, which may be a logic high (e.g., 1) signal, indicating that host 104 is driving K. The output of the detection signal is indicated by "comparator=1" in FIG. 3. The reference signal (e.g., a reference current) input to comparator 214 may be suitably set to configure comparator 214 to trip, i.e., output a logic high signal, when the voltage on the J leg drops below a threshold level to detect that host 104 is driving K.

Thus, the turnaround is detected, and host-side transceiver 204 stops driving K to host 104, and instead transitions to receive mode (operation 414). At this time, the J line pull-up resistor is enabled (on) and current source 218 is turned off. Host-side transceiver 204 signals peripheral-side transceiver 206 to change the data flow from downstream-to-upstream to upstream-to-downstream (operation 414). Peripheral-side transceiver 206 receives handshake control signals and switches to transmit mode. Until peripheral 106 stops Remote Wake signaling, both repeater 202 and peripheral 106 may drive K, but by protocol, peripheral 106 completes Remote Wake before host 104 completes Resume. Peripheral 106 completes Remote Wake in operation 416.

In operation 418, host 104 completes Resume and sends EOP. Host-side transceiver 204 detects this and signals to peripheral-side transceiver 206. EOP finishes with J signaling in both FS and LS. Both host-side and peripheral-side transceivers 204 and 206 revert to the mode and speed they were in prior to L1/L2, which usually means reverting to L0 mode. The turnaround is now complete (operation 420), with repeater 202, host 104 and peripheral 106 all in L0 mode.

In LS mode, the K and J states are reversed relative to FS. Thus, in LS mode, the pull-up resistors and associated switches identified with the J and K lines would be reversed, and comparator 222 and current source 224 would be used instead of their FS counterparts.

Figure 5:
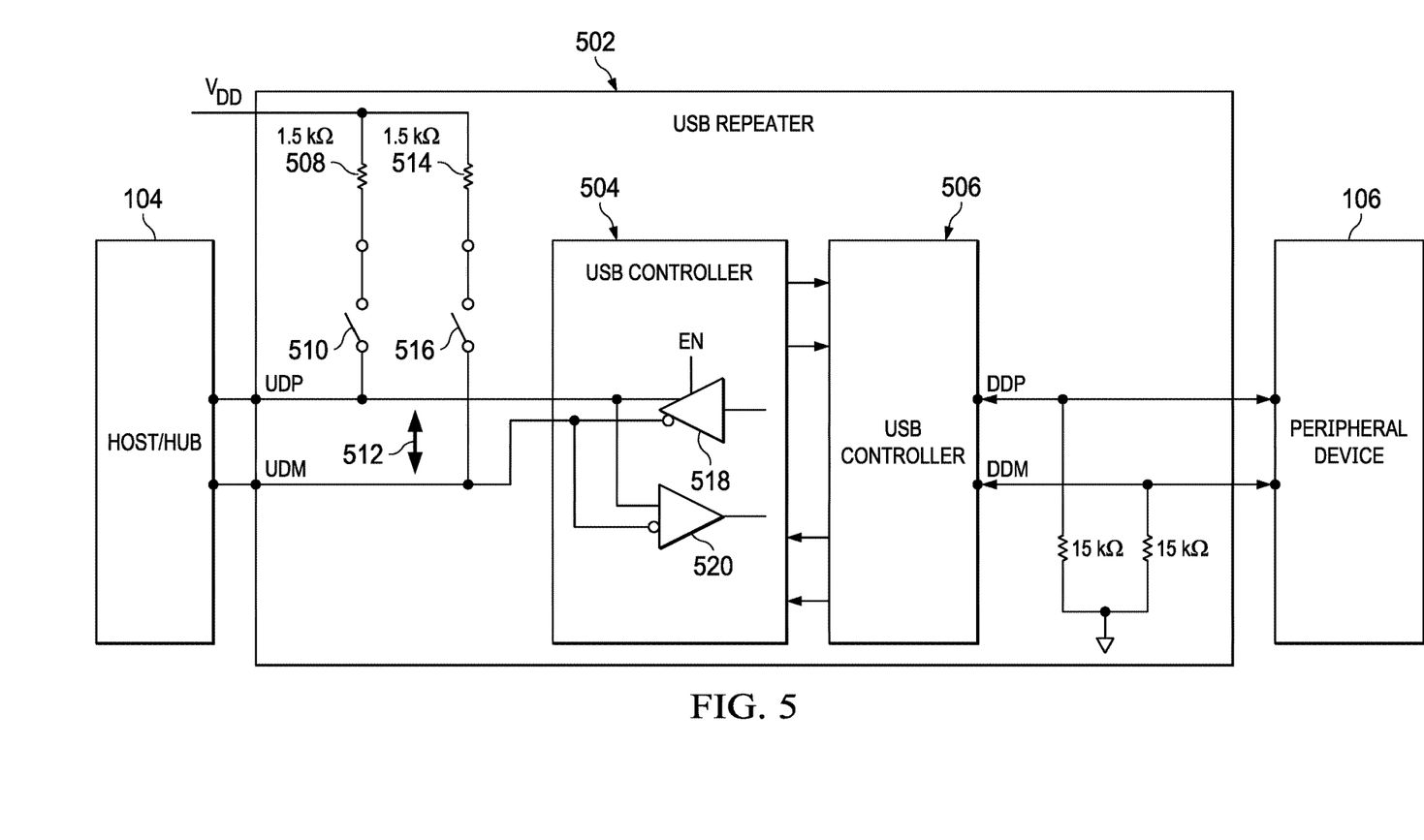
FIG. 5 is a diagram of another example repeater, e.g., a USB repeater, configured with a pull-up resistor on each of the upstream differential signal lines and example host-side and peripheral side transceivers, e.g., USB controllers.

FIG. 5 is a diagram of another example repeater 502, e.g., a USB repeater, coupled between a host/hub and a peripheral device, e.g., host 104 and peripheral 106. Repeater 502 is configured to facilitate the turnaround process of changing data flow on both sides of repeater 502 during Remote Wake.

Repeater 502 includes host-side and peripheral-side transceivers 504 and 506, respectively. Each of transceivers 504 and 506 may be a USB controller. Repeater 502 includes a pair of 1.5 kΩ pull-up resistors selectively coupled to the positive and negative upstream differential signal lines, respectively. To this end, a first 1.5 kΩ pull-up resistor 508 is coupled, via switch 510, to the positive line of upstream differential signal lines 512, and a second 1.5 kΩ pull-up resistor 514 is coupled, via switch 516, to the negative line of lines 512. Repeater 502 may also include a pair of 15 kΩ pull-down resistors respectively coupled to the downstream differential signal lines, as shown in FIG. 2. A corresponding pair of 15 kΩ pull-down resistors (not shown in FIG. 5) may be included on the host-side, e.g., in host 104, as shown in FIG. 1.

Host-side transceiver 504 includes a transmitter 518 and a receiver 520. Transmitter 518 is coupled to upstream differential signal lines 512 and also coupled to a receiver (not shown) in peripheral-side transceiver 506. Transmitter 518 is configured to receive an enable signal (EN) based on the positions of switches 510 and 516. Receiver 520 is coupled to lines 512 as well as to a transmitter (not shown) in peripheral-side transceiver 506.

Repeater 502 may include other components, as is known in the art. These other components are omitted for clarity and focus.

Figure 6:
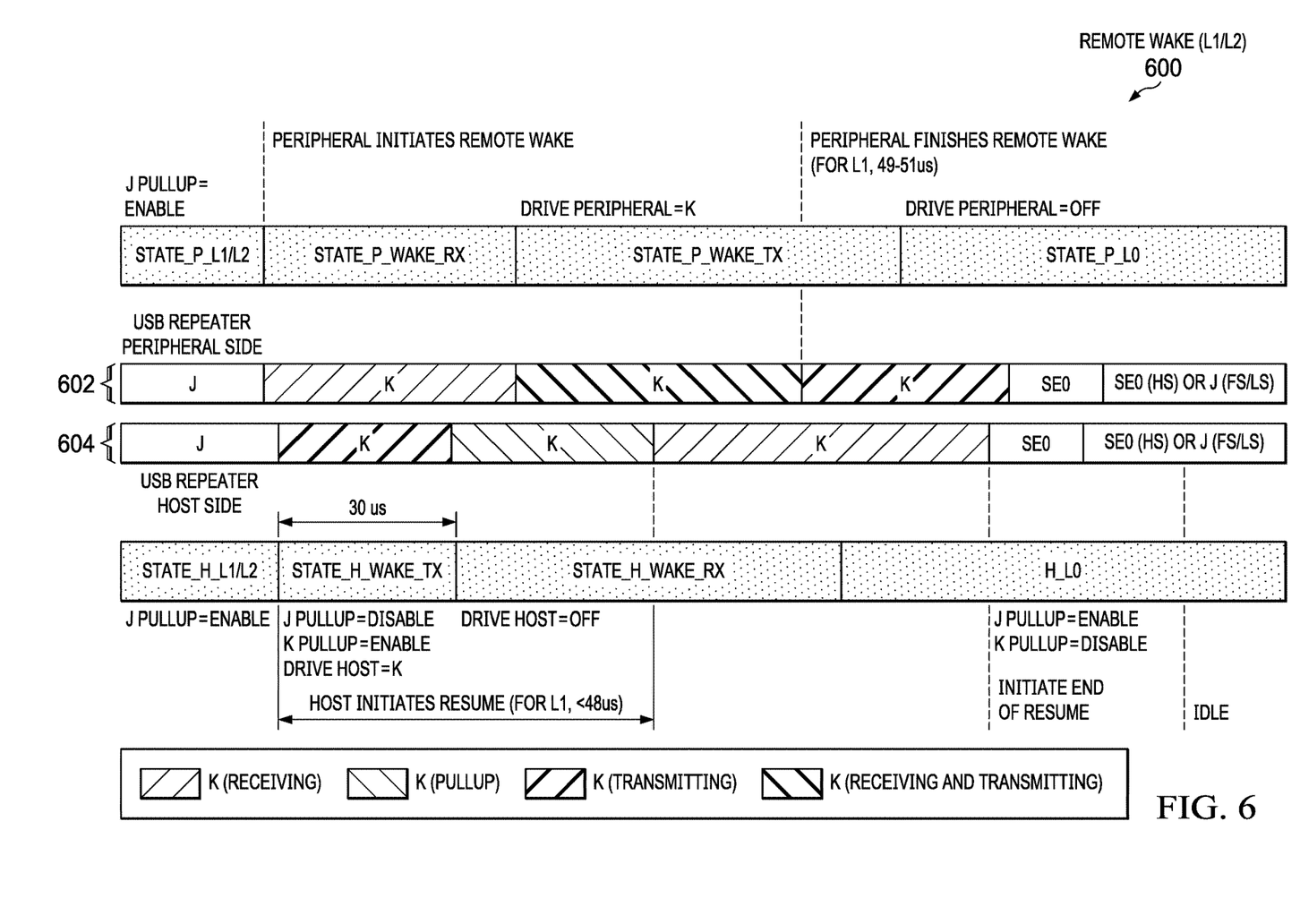
FIG. 6 is a timing diagram illustrating signaling for a Remote Wake sequence using a repeater, such as that shown in FIG. 5.
Figure 7:
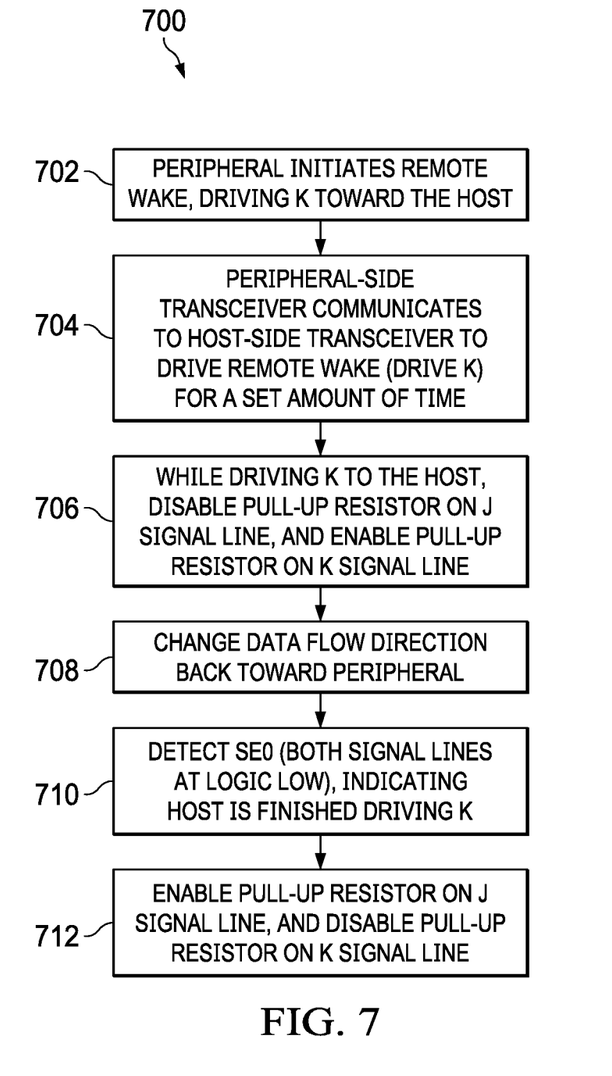
FIG. 7 is a flow diagram of another example method of operating an example repeater to execute the Remote Wake signaling shown in FIG. 6.

FIG. 6 is a timing diagram illustrating signaling for a Remote Wake sequence 600 using a repeater, such as repeater 502 shown in FIG. 5, and FIG. 7 is flow diagram depicting a method 700 of operating repeater 502 executing the Remote Wake sequence signaling shown in FIG. 6. The signaling sequence 600 and method 700 shown in FIGS. 6 and 7 is another way of implementing an improved Remote Wake signaling. Bar 602 in FIG. 6 depicts activity on the downstream differential signal lines between repeater 502 and peripheral 106 from the point of view of repeater 502. Bar 604 in FIG. 6 depicts activity on the upstream differential signal lines between repeater 502 and host 104 also from the point of view of repeater 502.

In operation 702, peripheral 106 initiates Remote Wake to exit L1 or L2, e.g., from the J or idle state, which includes driving K upstream. In response to receiving the K, peripheral-side transceiver 506 communicates to host-side transceiver 504 to drive K to host 104 for a relatively small, set amount of time, e.g., approximately 30 μs, (operation 704). While driving K to host 104, pull-up resistor 508 on the J line of upstream differential signal lines 512 is disabled, and pull-up resistor 514 on the K line of lines 512 is enabled (operation 706). This may be carried out by opening switch 510 and closing switch 516. The enable signal (EN) is turned off when switch 510 is open and switch 516 is closed. This control may be implemented via control signals, e.g., from host-side transceiver 504. This control of pull-up resistors 508 and 514 acts to implement a weak K signal. While K is being driven to host 104 by host-side transceiver 504, host 104 initiates Resume, which for L1 is <48 μs, and thus may continue after host-side transceiver 504 stops driving K. Peripheral 106 finishes Remote Wake after approximately 49-51 μs. The flow of data is reversed to flow downstream in operation 710. SE0 is then detected (both signal lines at logic low) in operation 710. Then, in operation 712, end of Resume is initiated in which the switch positions are returned to their original positions, i.e., pull-up resistor 508 on the J line is enabled, and pull-up resistor 514 on the K signal line is disabled. The peripheral-side bus maintains a K state throughout the sequence. With sequence 600 and method 700, the chance of missing the SE0, indicating the end of Resume (EOR), is substantially reduced.

The above description of FIGS. 5-7 is for FS mode. In LS mode, the K and J states are reversed relative to FS. Thus, in LS mode, the switch positions to generate the weak K would be reversed. The enable signal (EN) would still be off.

Each of the flow charts of FIG. 4 and FIG. 7 depicts one possible order of operations. Some operations may be combined and/or performed substantially simultaneously. Additional operations may be employed.

Various examples of repeaters, e.g., USB repeaters, and methods of operating the same are provided. These methods improve the overall Remote Wake sequence without the need for a highly accurate clock, thus improving performance while also reducing cost. The methods make transition from Remote Wake to Resume seamless.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrate d circuit, a device or other electronic or semiconductor component.

A circuit or device that is described herein as including certain components may instead be adapted to be coupled to those components to form the described circuitry or device. For example, a structure described as including one or more semiconductor elements may instead include only the semiconductor elements within a single physical device (e.g., a semiconductor die and/or integrated circuit (IC) package) and may be adapted to be coupled to other elements and/or voltage or current sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. A component, unless otherwise stated, may be representative of multiple instances of components configured to perform the stated functionality.

Uses of the phrase "ground" in the foregoing description include any suitable ground consistent with the teachings herein. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consist with the teachings provided.

What is claimed is:

1. A method of operating a repeater in communicating between a first device and a second device through the repeater, the method comprising:
   driving data in a first direction from the second device to the first device, including driving to a logic high state a first signal line, of a pair of signal lines between the first device and a first-device-side transceiver of the repeater, and not driving a second signal line of the pair of signal lines;
   disabling a resistive element coupled between a power supply voltage and a second signal line of the pair of signal lines;
   enabling a detection circuit of the first-device-side transceiver including applying current to the second signal line;
   driving, by the first device, the first signal line to a logic high state and the second signal line to a logic low state;
   detecting a changed signal level on the second signal line using the detection circuit; and
   changing data flow from the first direction to a second direction from the first device to the second device, in response to the detecting.

2. The method of claim 1, wherein the current applied is in a range of approximately 60 µA to approximately 80 µA.

3. The method of claim 1, wherein the amount of current applied to the second signal line is set such that the first device detects a logic low state on the second line prior to the first device driving the first signal line to a logic high state and the second signal line to a logic low state.

4. The method of claim 1, wherein the driving of data in the first direction from the second device to the first device is part of Remote Wake signaling by the second device.

5. The method of claim 4, wherein the driving, by the first device, the first signal line to a high logic state and the second signal line to a low logic state is part of Resume signaling by the first device; and the detecting of a changed signal level on the second signal line includes detecting the start of the Resume signaling by the first device.

6. A method of operating a repeater in communicating between a first device and a second device through the repeater, the method comprising:
   driving data in a first direction from the second device to the first device;
   driving a first signal line of a pair of signal lines between the first device and a first-device-side transceiver of the repeater to a logic low state, and driving a second signal line of the pair of signal lines to a logic high state;
   disabling a first pull-up resistive element coupled between a power supply voltage and the first signal line and enabling a second pull-up resistive element coupled between the power supply voltage and the second signal line;
   changing data flow from the first direction to a second direction from the first device to the second device;
   detecting a single-ended zero (SE0) state; and
   enabling the first pull-up resistive element and disabling the second pull-up resistive element.

7. The method of claim 6, wherein driving of the data in the first direction is part of Remote Wake signaling by the second device.

8. The method of claim 6, wherein the disabling of the first pull-up resistive element and the enabling of the second pull-up resistive element generates a modified K state on the pair of signal lines.

9. The method of claim 8, wherein, in the modified K state, the second signal line has a lower voltage than in a driven K state.

10. A repeater comprising:
    a transceiver including a detection circuit, the detection circuit comprising:
       a first current source;
       a first comparator having first and second inputs and an output, the first input coupled to a first signal line of a pair of signal lines and to the first current source, the second input configured to receive a reference signal, and the output configured to output a first detection signal;
       a second current source; and
       a second comparator having first and second inputs and an output, the first input coupled to a second signal line of the pair of signal lines and to the second current source, the second input configured to receive the reference signal, and the output configured to output a second detection signal.

11. The repeater of claim 10, further comprising:
    a first pull-up resistive element selectively couplable to the first signal line; and
    a second pull-up resistive element selectively couplable to the second signal line.

12. The repeater of claim 11, further comprising:
    a first switch disposed between the first pull-up resistive element and the first signal line; and
    a second switch disposed between the second pull-up resistive element and the second signal line.

13. The repeater of claim 10, wherein the repeater is a Universal Serial Bus (USB) repeater, and the transceiver is a USB controller.

14. A repeater comprising:
a first assembly including a first pull-up resistor and a first switch, the first assembly coupled to a first signal line of a pair of signal lines, the first switch moveable between an open position in which the first pull-up resistor is disconnected from the first signal line and a closed position in which the first pull-up resistor is connected to the first signal line;
a second assembly including a second pull-up resistor and a second switch, the second assembly coupled to a second signal line of the pair of signal lines, the second switch moveable between an open position in which the second pull-up resistor is disconnected from the second signal line and a closed position in which the second pull-up resistor is connected to the second signal line; and
a transmitter coupled to the first and second signal lines and further including an enable input configured to receive an enable signal based on the positions of the first and second switches.

15. The repeater of claim 14, wherein, when the first switch is in the closed position, the first pull-up resistor is coupled between the first signal line and a power supply voltage.

16. The repeater of claim 14, wherein, when the second switch is in the closed position, the second pull-up resistor is coupled between the second signal line and a power supply voltage.

17. The repeater of claim 14, wherein the first and second switches are configured to be operated to generate a modified K state.

18. The repeater of claim 14, wherein the repeater is a Universal Serial Bus (USB) repeater.

19. A method of operating a Universal Serial Bus (USB) repeater in communicating between a first device (host) and a second device (peripheral) through the USB repeater, the method comprising:
driving Remote Wake signaling by the second device including driving a K state to exit from a sleep or suspend state;
detecting, using circuitry of the USB repeater, when the first device starts driving Resume signaling; and
changing data flow from a first direction from the second device to the first device to a second direction from the first device to the second device, in response to the detecting.

20. The method of claim 19, wherein the driving of Resume signaling including driving a K state by the first device.

21. The method of claim 19, wherein the circuitry comprises at least one comparator and at least one current source.

22. The method of claim 19, wherein the circuitry comprises a pair of switch-enabled pull-up resistors.

* * * * *